(12) United States Patent
Ackley et al.

(10) Patent No.: US 7,527,670 B2
(45) Date of Patent: May 5, 2009

(54) METHOD AND APPARATUS FOR GAS PURIFICATION

(75) Inventors: Mark William Ackley, East Aurora, NY (US); Himanshu Saxena, Columbus, OH (US); Gregory William Henzler, East Amherst, NY (US); Jeffert John Nowobilski, Orchard Park, NY (US)

(73) Assignee: Praxair Technology, Inc., Danbury, CT (US)

( * ) Notice: Subject to any disclaimer, the term of this patent is extended or adjusted under 35 U.S.C. 154(b) by 173 days.

(21) Appl. No.: 10/499,360

(22) PCT Filed: Dec. 19, 2002

(86) PCT No.: PCT/US02/40591

§ 371 (c)(1), (2), (4) Date: Jul. 7, 2005

(87) PCT Pub. No.: WO03/053546

PCT Pub. Date: Jul. 3, 2003

(65) Prior Publication Data

US 2006/0162556 A1    Jul. 27, 2006

Related U.S. Application Data

(60) Provisional application No. 60/342,673, filed on Dec. 20, 2001, provisional application No. 60/384,611, filed on May 31, 2002.

(51) Int. Cl.
    B01D 53/04 (2006.01)
(52) U.S. Cl. .............................. 95/96; 95/106; 95/119; 95/123; 95/129; 95/139; 95/902; 96/130; 96/132

(58) Field of Classification Search ............. 95/96–106, 95/117–120, 123, 129, 139, 902; 96/130, 96/131, 132, 133, 143, 144
See application file for complete search history.

(56) References Cited

U.S. PATENT DOCUMENTS 4,507,271 A    3/1985    Van Deyck et al.
4,711,645 A    12/1987   Kumar (Continued)

FOREIGN PATENT DOCUMENTS

EP    0 862 938 A1    9/1998

(Continued)

OTHER PUBLICATIONS

Rege et al., "Sorbents for Air Prepurification in Air Separation", Chemical Engineering Science, 55 (2000) pp. 4827-4838.

Primary Examiner—Frank M Lawrence
(74) Attorney, Agent, or Firm—Iurie A. Schwartz

(57) ABSTRACT

This invention comprises an adsorption process for the removal of at least $N_2O$ from a feed gas stream that also contains nitrogen and possibly $CO_2$ and water. In the process the feed stream is passed over adsorbents to remove impurities such as CO2 and water, then over an additional adsorbent having a high $N_2O/N_2$ separation factor. In a preferred mode the invention is an air prepurification process for the removal of impurities from air prior to cryogenic separation of air. An apparatus for operating the process is also disclosed.

21 Claims, 7 Drawing Sheets

U.S. PATENT DOCUMENTS

| | | |
|---|---|---|
| 4,933,158 A | 6/1990 | Aritsuka et al. |
| 4,935,580 A | 6/1990 | Chao et al. |
| 4,964,889 A | 10/1990 | Chao |
| 5,587,003 A * | 12/1996 | Bulow et al. .................. 95/123 |
| 5,919,286 A | 7/1999 | Golden et al. |
| 5,938,819 A | 8/1999 | Seery |
| 6,106,593 A * | 8/2000 | Golden et al. ................. 95/120 |
| 6,350,298 B1 * | 2/2002 | Su et al. ........................ 95/96 |
| 6,358,302 B1 | 3/2002 | Deng et al. |
| 6,391,092 B1 | 5/2002 | Shen et al. |
| 6,461,412 B1 * | 10/2002 | Jale et al. ..................... 95/130 |

FOREIGN PATENT DOCUMENTS

| | | |
|---|---|---|
| EP | 1 064 978 A1 | 1/2001 |
| EP | 0 995 477 B1 | 7/2002 |
| EP | 1 092 465 A3 | 1/2003 |

\* cited by examiner

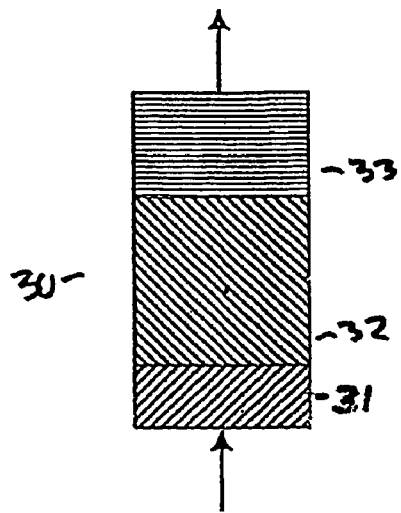
Fig. 7a
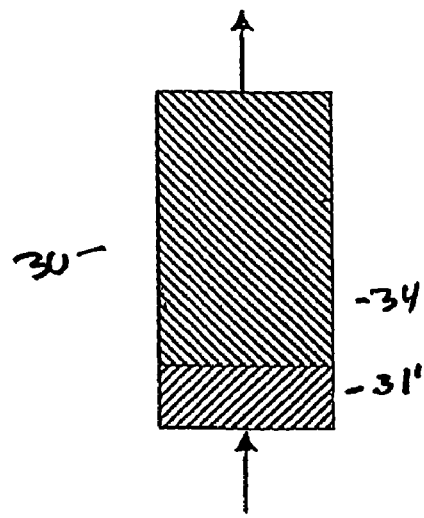
Fig. 7b
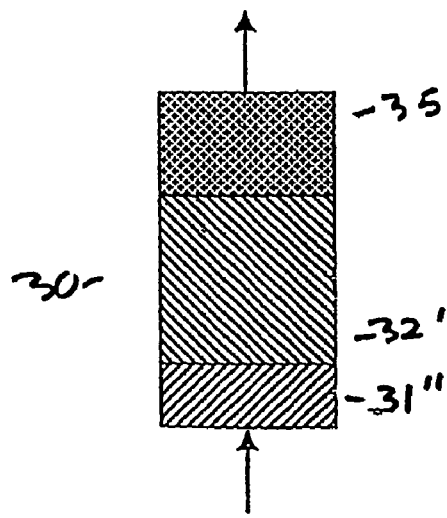
Fig. 7c
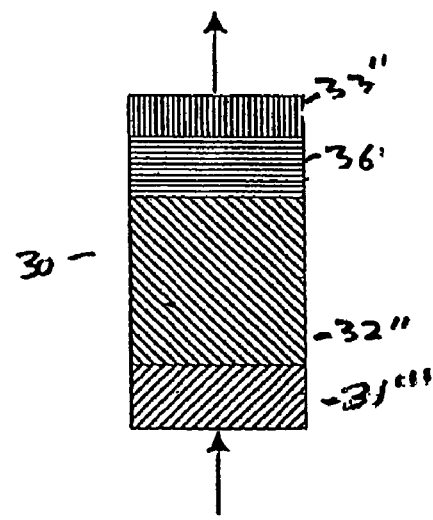
Fig. 7d
Figure 7

METHOD AND APPARATUS FOR GAS PURIFICATION

This application claims the benefit of U.S. provisional applications 60/342,673, filed Dec. 20, 2001 and 60/384,611, filed May 31, 2002 the entire teachings of both are herein incorporated by reference.

FIELD OF THE INVENTION

This invention relates to the removal of $N_2O$, hydrocarbons, water vapor and $CO_2$ from gas streams, and more particularly to the removal of impurities from air, using adsorptive separation, prior to cryogenic separation of air.

BACKGROUND OF THE INVENTION

Cryogenic separation of air requires a pre-purification step to remove contaminants such as water, $CO_2$ and hydrocarbons from air. In cold sections of the separation process (such as heat exchangers and LOX sump), water and $CO_2$ can solidify and block the heat exchangers or other components in the distillation columns. Acetylene and other hydrocarbons in air present a potential hazard. The high boiling hydrocarbons can accumulate in the liquid oxygen and create an explosion hazard. Thus, those impurities in air must be removed in an adsorptive clean-up process prior to the cryogenic distillation of air.

Nitrous oxide ($N_2O$) should also be removed from air prior to separation. $N_2O$ is currently present in air at a concentration of about 300-350 ppb, however, this concentration is increasing annually at a rate of about 0.3%. Various factors such as emissions from motor vehicles, $HNO_3$ plants, adipic acid and caprolactam plants (both use $HNO_3$ for oxidation of inorganics) contribute to this growing ambient concentration of $N_2O$. The presence of greater than 50 ppb of $N_2O$ can be a serious problem for cryogenic air separation units (ASU) because it can form solid deposits in distillation columns. $N_2O$ also decreases the solubility of $CO_2$ in liquid oxygen, thereby increasing the potential for freezing of $CO_2$ in the distillation columns. This can result in degraded performance and can even cause blockage of heat exchangers.

Air prepurification can be accomplished using pressure swing adsorption (PSA), temperature swing adsorption (TSA) or a combination of both (TSA/PSA) incorporating either a single adsorbent or multiple adsorbents. When more than one adsorbent is used, the adsorbents may be configured as discrete layers, as mixtures, composites or combinations of these. Impurities such as $H_2O$ and $CO_2$ are commonly removed from air using two adsorbent layers in a combined TSA/PSA process. Normally, a first layer of activated alumina is used for water removal and a second layer of 13x molecular sieve is used for $CO_2$ removal. Prior art, such as U.S. Pat. No. 4,711,645, teaches the use of various adsorbents and methods for removal of $CO_2$ and water vapor from air.

Centi et al. (Ind. Eng. Chem. Res., vol. 39, pp 131-137, 2000) studied the behavior of various ion exchanged forms of ZSM5 Zeolites for removal of relatively high concentrations of $N_2O$ (500 ppm (parts per million) to 2000 ppm) from industrial gas streams. ZSM5, being a high Si/Al ratio (2-200) zeolite, has less water affinity than its low Si/Al ratio counterparts. The best performance for $N_2O$ removal in Centi's study is shown by Ba and Sr exchanged ZSM5. The paper indicates that in the presence of water, metal exchanged ZSM-5 has better $N_2O$ adsorption properties than lower Si/Al ratio zeolites such as X and Y type zeolites.

U.S. Pat. No. 6,106,593 teaches a process, preferably TSA, that uses a three-layer adsorbent bed for successive removal of water, $CO_2$ and $N_2O$, wherein the preferred adsorbent is binderless CaX. Other adsorbents such as CaX (with binder), BaX and Na-mordenite are also recommended for the third layer. According to the patent, the criteria for selecting an adsorbent for $N_2O$ removal is a Henry's law selectivity for $N_2O$ compared to $CO_2$ of 0.49 or more at 30° C. and a Henry's law constant for $N_2O$ adsorption of at least 79 mmol/gm.

European patent application EP 0 862 938 teaches the placement of a zeolite adsorbent selected from X-zeolite, Y-zeolite, A-zeolite or mixtures thereof downstream of an alumina adsorbent in a PSA process to remove nitrogen oxides, such as NO, $NO_2$, $N_2O$ and $N_2O_3$. European Patent Application EP 0 995 477 teaches a method of removing at least a portion of $N_2O$ in a gas stream using a type-X zeolite with a Si/Al ratio of 1.0-1.5 and containing a mixture of $K^+$(<35%), $Na^+$(1-99%) and $Ca^{2+}$(1-99%) cations in various proportions.

European Patent Application (EP 1 092 465) teaches a TSA process (sequentially removing $H_2O$, $CO_2$ and $N_2O$ and optionally hydrocarbons using a three-layer configuration of adsorbents. A NaLSX adsorbent is preferred in the second layer for $CO_2$ removal. A LSX zeolite (Si/Al=0.9-1.3), preferably CaLSX zeolite, is suggested for $N_2O$ and hydrocarbon removal.

European Patent Application EP 1 064 978 teaches the use of BaX zeolite to remove propane, ethylene and $N_2O$ in a PSA or TSA process. The BaX zeolite contains at least 30% barium cations.

U.S. Pat. No. 4,156,598 teaches the method of removing $N_2O$ from nitrogen trifluoride by passing the gas through a synthetic zeolite adsorbent, such as sodium or calcium exchanged type X or type A zeolite.

U.S. Pat. No. 4,933,158 teaches a method of removing $N_2O$ and $CO_2$ from nitrogen trifluoride by passing the gas through a thermally treated zeolite selected from the group consisting of analcime, clinoptilolite, mordenite, ferrierite, phillipsite, chabazite, erionite and laumotite.

U.S. Pat. No. 4,507,271 teaches the method of removing $N_2O$ from a gas containing hydrogen, nitric oxide and nitrous oxide using A, X or Y zeolite.

U.S. Pat. No. 5,587,003 discloses a method for removing substantially all of the $CO_2$ from air using the adsorbent clinoptilolite.

Rege et al. (Chemical Engineering Science, vol. 55, pp 4827-4838, 2000) showed 13x adsorbent to provide better $CO_2$ removal from air than clinoptilolite. Rege also showed that Ca-exchanged clinoptilolite to have low $N_2$ adsorption.

Catalytic decomposition of the contaminant is another means of removing an undesirable component from a gas mixture. A catalyst/adsorbent can be used much in the same way as described above except that the product of decomposition must be either removed as an additional contaminant or be an acceptable component of the gas mixture.

The prior art has typically derived its solution to the problem by seeking adsorbents with high $N_2O$ to $CO_2$ selectivity. However, given the similar electronic structure of $N_2O$ and $CO_2$, and the nearly 1000-fold difference in gas phase concentration between $N_2O$ and $CO_2$ in air, this methodology is difficult to apply. Thus an improved process and apparatus for the removal of $N_2O$ and other impurities from air is required.

SUMMARY OF THE INVENTION

In a preferred embodiment of the invention, $CO_2$ and water are removed from the feed air, then an adsorbent having a high $N_2O/N_2$ separation factor is used for $N_2O$ removal. Such adsorbent also has a higher Si/Al ratio and modest to low $N_2O/CO_2$ selectivity as compared to the prior art.

In a preferred embodiment, the invention relates to an adsorption process for the removal of $N_2O$ from a gas containing $N_2O$, nitrogen and other components to produce a product gas, said process comprising passing said gas over a bed of one or more adsorbents, wherein at least one of the adsorbents is selected from the group consisting of clinoptilolite, chabazite and Li-exchanged zeolite or combinations thereof.

In a more preferred embodiment, the gas is air and the other components include water and $CO_2$.

In one embodiment $N_2O$ is in said gas in an amount of less than 100 ppm.

In one embodiment the water and the $CO_2$ are adsorbed on an additional adsorbent prior to the gas passing over the clinoptilolite, chabazite or Li-exchanged zeolite.

In one embodiment the process is an air prepurification process.

In a preferred embodiment, at least 90% of the $N_2O$ in the gas is adsorbed.

In one embodiment the Li-exchanged zeolite is LiX.

The invention also comprises a process for the separation of N2O from a gas stream containing at least $N_2O$ and nitrogen, said process comprising passing said gas stream over a bed of adsorbent having a working capacity $\Delta N_2O$ of greater than or equal to $3.56 \times 10^{-4}$ at IBL.

In a preferred embodiment the gas stream is air.

In a preferred embodiment the adsorbent is selected from the group consisting of clinoptilolite, chabazite and Li-exchanged zeolite or combinations thereof.

In a preferred embodiment the gas stream contains less than 100 ppm $N_2O$.

The invention also comprises an adsorption apparatus for the removal of $N_2O$ from a gas containing $N_2O$, nitrogen and other components, said apparatus comprising one or more beds of at least a first adsorbent, wherein said first adsorbent is an $N_2O$ selective adsorbent selected from the group consisting of clinoptilolite, chabazite and Li-exchanged zeolite.

In a preferred embodiment the other components in the gas include $H_2O$ and $CO_2$, and said apparatus further contains one or more additional adsorbents for the adsorption of $H_2O$ and $CO_2$, and wherein the additional adsorbents are upstream of said first adsorbent.

The process and apparatus of the present invention provide surprisingly superior $N_2O$ removal efficiency over prior art processes and systems.

BRIEF DESCRIPTION OF THE DRAWINGS

Other objects, features and advantages will occur to those skilled in the art from the following description of preferred embodiments and the accompanying drawings, in which:

FIG. 7a illustrates a bed from a conventional prepurifier with an added layer for $N_2O$ removal in accordance with the invention.

FIG. 7b illustrates a bed from a prepurifier with a first layer for water removal and a downstream mixed layer for $CO_2$ and $N_2O$ removal.

FIG. 7c illustrates a bed from a prepurifier with a first layer for water removal and a downstream mixed layer for hydrocarbon and $N_2O$ removal.

FIG. 7d illustrates a bed from a prepurifier with a first layer for water removal a second layer for $CO_2$ removal, a third layer for removal of hydrocarbons and a final layer for $N_2O$ removal.

DETAILED DESCRIPTION OF THE INVENTION

Figure 1:
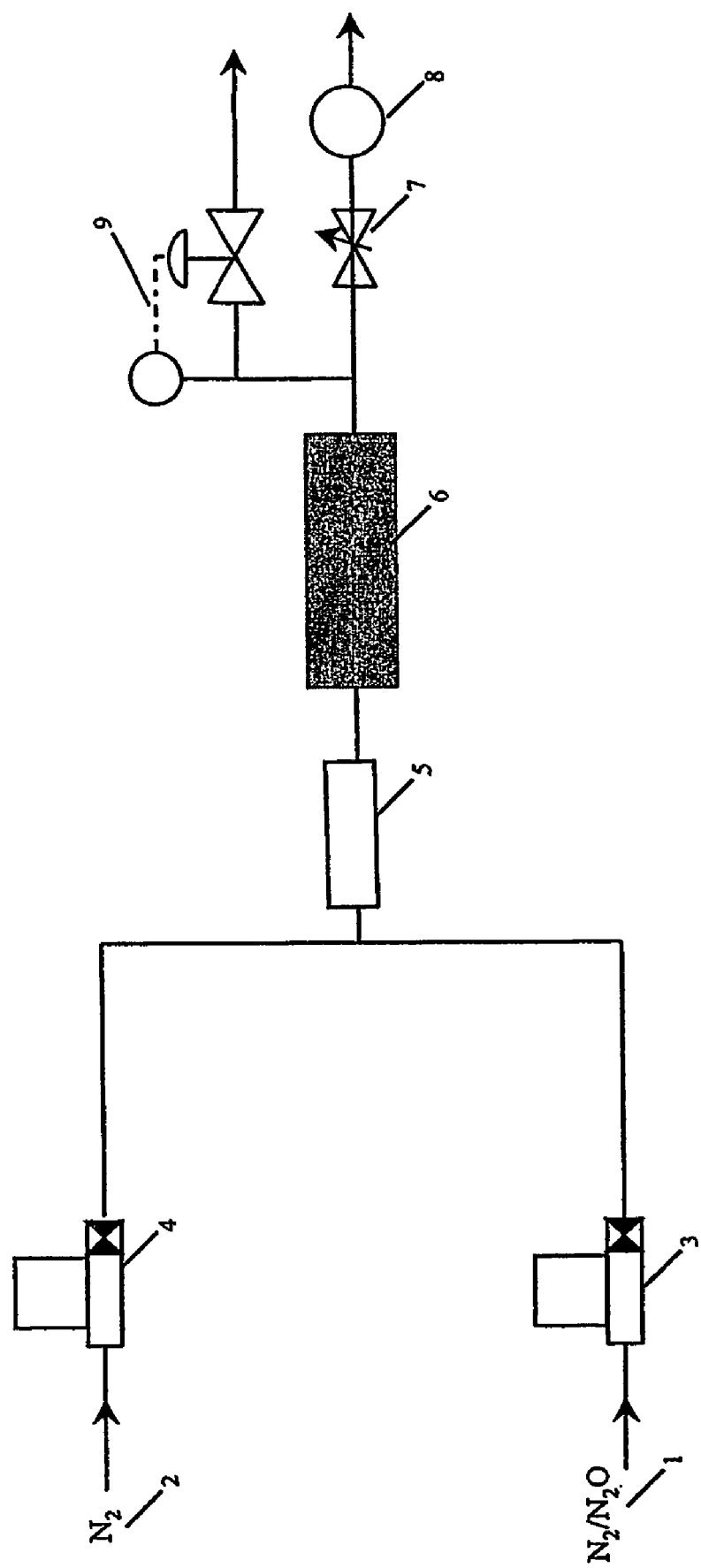
FIG. 1 is a schematic diagram of the breakthrough test apparatus.

The invention is based upon first recognizing the critical components ($N_2O/N_2$) to be separated, then isolating these critical components in an adsorption zone within the adsorber and finally selecting an adsorbent that can efficiently affect the separation.

The general problem to be solved is the removal of ppb levels ($\approx$350-400 ppb) of $N_2O$ from a mixture of air containing other contaminants (including at least $CO_2$ and $H_2O$) prior to air separation by cryogenic means.

In a process for removal of contaminants from a gas mixture by adsorption, it is common to adsorb contaminants successively in the order of decreasing adsorptivity and/or decreasing selectivity with respect to a chosen adsorbent. The effectiveness of such a process can often be improved by using a combination of adsorbents, configured in layers or mixtures, to enhance the removal of each contaminant, i.e. by selecting particular adsorbents to achieve maximum adsorptivity and/or selectivity of each contaminant relative to the gas mixture. The use of different adsorbents disposed in layers in the adsorber is well known in the art.

The selection of an adsorbent to remove a particular contaminant depends upon many factors, e.g. the type and composition of both the targeted contaminant and other gases in the mixture at the point of removal within the adsorber, the relative selectivity of the adsorbent for the contaminant(s) and non-contaminants, and the loading capacity of the adsorbent for the contaminant.

In a preferred embodiment of the invention, an adsorbent bed is first configured to remove substantially all of the $CO_2$ and $H_2O$ from the feed stream (e.g. air) prior to removing $N_2O$. $N_2O$ is then subsequently removed the partially purified feed stream. The present invention differs from the prior art in that an adsorbent is selected for the $N_2O$ separation such that the adsorbent has both a high $\Delta N_2O/\Delta N_2$ separation factor and a high $\Delta N_2O$ (in the presence of high $N_2$ concentrations) capacity. Natural clinoptilolite, natural chabazite and LiX are preferred embodiments for $N_2O$ removal from gases, particularly air, in accordance with the invention. With the addition of the $N_2O$ adsorbent, the combination of all the adsorbents in the bed removes at least 90% and preferably all of the $N_2O$ from the feed stream. Thus, the purified stream contains preferably less than 100 ppb (parts per billion), more preferably less than 50 ppb and most preferably less than 10 ppb $N_2O$ at the local stream conditions Thus, this invention provides a simple and efficient way to substantially remove all of $N_2O$ prior to cold box in cryogenic air separation plants, thereby ensuring a safe operation and potentially reducing liquid oxygen drainage.

The results of the present invention are even more surprising when evaluated in the context of the prior art selection criteria, i.e. the ratio of Henry Law constants for $N_2O/$ $CO_2$>0.49 (U.S. Pat. No. 6,106,593). The ratio of Henry Law constants (ratio of initial isotherm slopes for $N_2O/CO_2$) was computed for clinoptilolite.

This ratio was found to be about 0.40, well below the minimum recommended value of U.S. Pat. No. 6,106,593.

The prior art solution to the problem of removing $N_2O$ from air has focused upon finding an adsorbent with high $N_2O/CO_2$ selectivity; however, this is difficult due to the similar electrostatic properties of these two adsorbates. Further electrostatic considerations do not recognize the significant effects of the relative concentrations of the adsorbates; e.g. in ambient air, $CO_2$ concentrations are typically 350 ppm to 400 ppm, one thousand times that of $N_2O$ concentrations.

In the present invention because $H_2O$ and $CO_2$ are almost completely removed prior to $N_2O$ removal, the relevant separation is the removal of $N_2O$ from $N_2$. In this case, while electrostatics favor the selectivity of $N_2O$, the significant concentration difference (~790,000 ppm $N_2$ compared to ~350 ppb $N_2O$) favors the adsorption of $N_2$. Thus in accordance with the present invention the adsorbent required has high $N_2O/N_2$ selectivity, low $N_2$ working capacity and sufficient $N_2O$ working capacity to satisfy the purification requirements.

In the practice of the present invention, adsorbent performance may be estimated by determining the working capacity of each of the primary adsorbates, i.e. $N_2$ and $N_2O$. The separation factor α, as defined below is utilized to evaluate the adsorbent effectiveness. This methodology is discussed in detail in U.S. Pat. No. 6,152,991.

$$\alpha = \frac{\Delta N_2O}{\Delta N_2} = \frac{w_{N_2O}(y, p, T)_{ads} - w_{N_2O}(y, p, T)_{des}}{w_{N_2}(y, p, T)_{ads} - w_{N_2}(y, p, T)_{des}} \quad (1)$$

where separation factor α is defined as the ratio of the working capacities. The numerator in this equation is the working capacity of $N_2O$, which is equal to the difference in loading w between adsorption and desorption conditions. The adsorption and desorption conditions are characterized by composition y, pressure p and temperature T.

In TSA air prepurification, maximum regeneration temperatures may vary from about 100° C. to about 350° C. As a result, it is expected that the adsorbates (particularly atmospheric gases) will be completely thermally desorbed. Under such conditions, Equation (1) can be simplified as follows:

$$\alpha = \frac{\Delta N_2O}{\Delta N_2} = \frac{w_{N_2O}(y, p, T)_{ads}}{w_{N_2}(y, p, T)_{ads}} \quad (2)$$

When a contaminant is removed in a shallow adsorbent layer in TSA and significant resistance to mass transfer exists, the selectivity is redefined according to Equation (3):

$$\frac{\Delta X_A}{\Delta X_B} = \frac{\frac{m_{in}}{w_s} \int_0^{t_b} (y_{in} - y_{out}) dt}{X_B(y, P, T)_{ADS}} \quad (3)$$

The numerator in Equation (3) represents the working capacity of the adsorbent for the contaminant. $m_{in}$ represents the molar feed flow into the bed, $y_{in}$ and $y_{out}$ are the inlet and outlet mole fractions of the minor component, respectively, $w_s$ is the mass of adsorbent and tb is the breakthrough time corresponding to a predetermined concentration. The denominator is the equilibrium capacity of the major component at the conditions at the end of the adsorption step, i.e. assuming complete desorption of all components. This situation may result when using small pore zeolites at conditions where the depth of the adsorbent layer is shorter than the mass transfer zone length.

This method is superior to prior art methods for evaluating the selectivity of $N_2O$ in that the working capacities are determined at the partial pressure of each individual component at the relevant process conditions. Furthermore, coadsorption effects are incorporated in the determination of the loadings. The analysis can be performed using either a multicomponent isotherm model supported by pure component data (e.g. loading ratio correlation isotherm model) or directly from experimental data. Since the concentration of $N_2$ is overwhelming compared to $N_2O$, the coadsorption effect of $N_2O$ upon $N_2$ is negligible. Thus, the denominator of Equation (2) or Equation (3) may be obtained directly from the measured pure-component $N_2$ isotherm.

Conversely, the coadsorption of $N_2$ has a very significant effect upon the adsorption of $N_2O$. If accurate low concentration pure-component isotherm data for $N_2O$ is available or attainable, then Equation (2) may be applied to assess working capacity and selectivity. Otherwise, it is preferred to determine the working capacity for $N_2O$ directly under coadsorption conditions with $N_2$ using the breakthrough test method, which is well known to those skilled in the art. This allows any kinetic effects to be incorporated into the working capacity as well. The breakthrough tests allow for the determination of the equilibrium capacity of a component at saturation, and the breakthrough capacity and time at some defined breakthrough level, e.g. 50 ppb.

In order to evaluate adsorbents for $N_2O$ working capacity and separation factor according to Equation (3), a breakthrough test apparatus was constructed as shown in FIG. 1.

The adsorbents tested were obtained from the sources listed below. The natural adsorbents (clinoptilolite and chabazite) were obtained from Steelhead Specialty Minerals, WA. Synthetic zeolites were obtained from various manufacturers: Zeolyst (ZSM5, mordenite), Zeochem (CaX(2.5) and >85% Ca) and UOP (13X, NaX(2.3), LiX(2.3) >97% Li; LiX(2.0) >97% Li, NaY). Note that the numbers recited in the parentheses (e.g. 2.5, 2.3, and 2.0) refer to $SiO_2/Al_2O_3$ ratio. All of the adsorbents were thermally regenerated at 350° C., 1.0 bar pressure and under $N_2$ purge for approximately 16 hours before each test. After regeneration the adsorbents were allowed to cool to the test temperature of 27° C.

Breakthrough tests were conducted using the following feed gas mixtures: 1.0 ppm $N_2O$ in $N_2$ and 1.0 ppm $N_2O$ in He. Also, $N_2$ isotherms were determined gravimetrically. The results from these tests were examined to determine $N_2O$ separation factor and working capacity. Tests were performed to saturation, i.e. until the effluent $N_2O$ concentration reached the feed level concentration. For evaluating various adsorbents, a $N_2O$ concentration of 1.0 ppm was selected. All of the breakthrough tests were performed at 6 bar, 300 K and an inlet gas flowrate of approximately 21.3 slpm (0.08 kmol/m² s) using an adsorption column length of either 22.9 cm or 5.6 cm. The feed conditions are representative of conditions at the inlet of an air prepurifier for a typical cryogenic air separation plant. Breakthrough curves were also generated using 1.0 ppm $N_2O$ in He and 1.0 ppm $CO_2$ in He to determine pure-component $N_2O$ or $CO_2$ loadings, respectively. In order to determine the coadsorption effects of $N_2O$ and $CO_2$ in $N_2$, breakthrough tests were also performed using 1.0 ppm $N_2O$+ 1.0 ppm $CO_2$ in $N_2$. Initial breakthrough was established at 50.0 ppb $N_2O$ and initial breakthrough loading (IBL) was determined as the average amount of $N_2O$ adsorbed per unit weight of adsorbent at the 50.0 ppb breakthrough.

Breakthrough tests are conducted in the following manner using the apparatus shown in FIG. 1. A challenge gas from source 1 containing the contaminant(s) of interest (e.g. 10 ppm $N_2O$ in $N_2$) is metered through flow controller 3, and mixes in a gas mixer 5 with high purity diluent $N_2$ or He from source 2 and provided at a prescribed flowrate through a flow controller 4 to achieve the desired feed concentration of contaminant(s). This mixed challenge gas is then fed to the test bed 6 containing the adsorbent. The effluent is passed through a flow meter 7 to the $N_2O$ analyzer 8 (TEI Model 46-C) where the breakthrough concentration of $N_2O$ is monitored as a function of time. Control valve 9 is used to maintain the desired pressure in the system. The piping and adsorbent bed are maintained at the same temperature as the feed by immersing them in a thermostat bath (not shown).

The following are non-limiting examples that illustrate the methodology for selecting adsorbents and their implementation in accordance with the invention.

EXAMPLE 1

$N_2$ Coadsorption Effects

Figure 2:
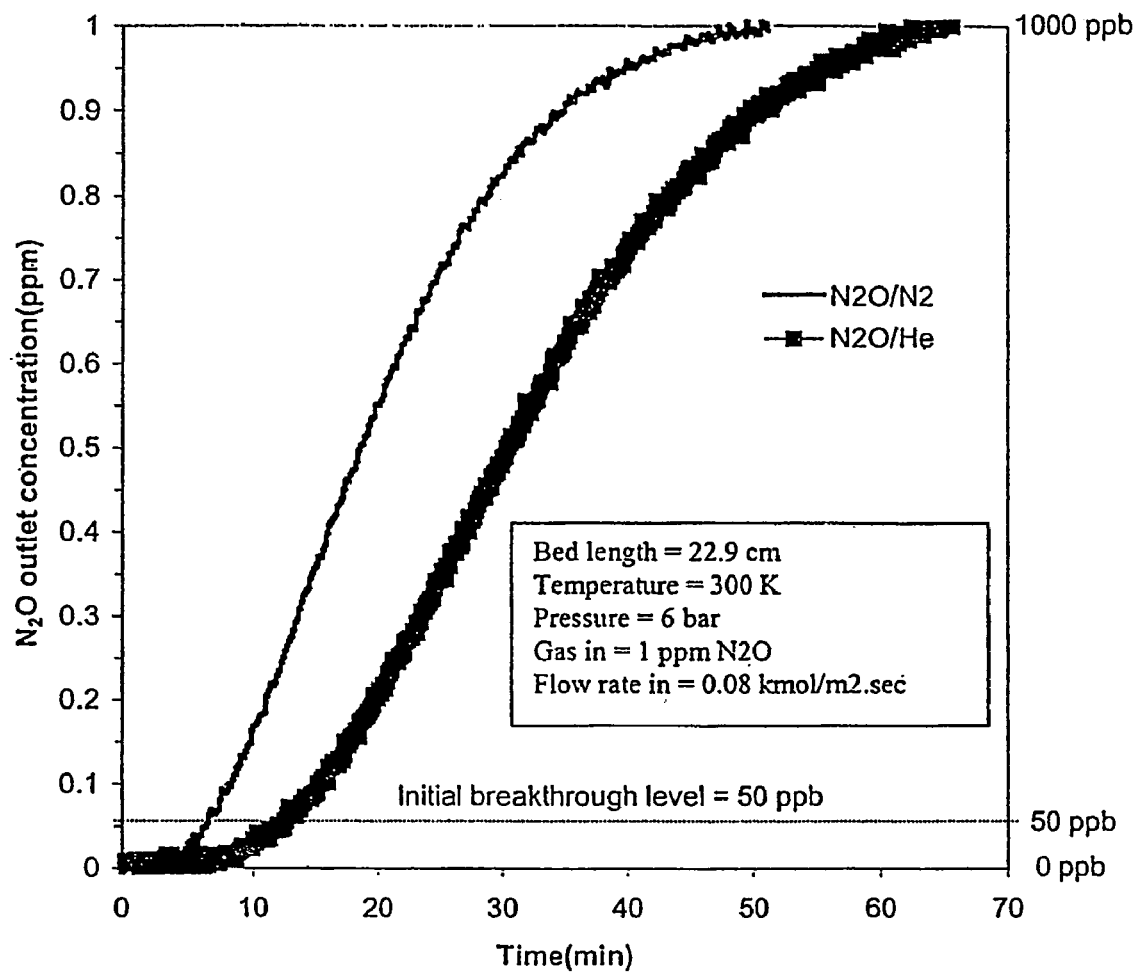
FIG. 2 is a graph of $N_2O$ breakthrough curves for NaX(2.5) for $N_2O/N_2$ and $N_2O/He$.

Adsorbents were tested as described above to determine the effect of $N_2$ coadsorption upon the adsorption of $N_2O$. The results of the saturation capacity of $N_2O$ (1.0 ppm) in $N_2$ and in He on various adsorbents are compared in Table 1 below. These results were determined for feed conditions of 6.0 bar, 300° K. and 0.08 kmol/m$^2$ s molar flux using a 22.9 cm or 5.6 cm adsorbent bed length. The $SiO_2/Al_2O_3$ ratio is specified for some adsorbents in the table, e.g. NaX ($SiO_2/Al_2O_3$=2.3). FIG. 2 shows $N_2O$ breakthrough curves for adsorbent 13X (NaX 2.5) for $N_2O$ in $N_2$ and $N_2O$ in He.

TABLE 1

Effect of $N_2$ Coadsorption Upon $N_2O$ Loading

| Material | $N_2O$ loading (mmol/gm) 1.0 ppm $N_2O$/He | $N_2O$ loading (mmol/gm) 1.0 ppm $N_2O/N_2$ | Preferred Adsorbents |
|---|---|---|---|
| NaY | $4.06 \times 10^{-4}$ | $1.42 \times 10^{-4}$ | |
| NaZSM5 | $1.7 \times 10^{-3}$ | $3.59 \times 10^{-4}$ | |
| NaKX | | $4.58 \times 10^{-4}$ | |
| 13X NaX (2.5) | $9.55 \times 10^{-4}$ | $6.09 \times 10^{-4}$ | |
| NaX (2.3) | $1.73 \times 10^{-3}$ | $7.03 \times 10^{-4}$ | |
| CaX | | $1.98 \times 10^{-3}$ | |
| Na-Mordenite | | $6.38 \times 10^{-3}$ | |
| Clinoptilolite (CS400) | $8.86 \times 10^{-2}$ | $3.60 \times 10^{-3}$ | X |
| LiX (2.3) | $5.5 \times 10^{-3}$ | $1.22 \times 10^{-3}$ | X |
| LiX (2.0) | $6.7 \times 10^{-3}$ | $1.74 \times 10^{-3}$ | X |
| Chabazite | $6.75 \times 10^{-2}$ | $3.42 \times 10^{-3}$ | X |
| Clinoptilolite (TSM140) | $6.84 \times 10^{-2}$ | $8.20 \times 10^{-3}$ | X |

These results clearly show the substantial effect of $N_2$ coadsorption, resulting in a decrease in $N_2O$ capacity from 36% to 96% compared to the single component saturation capacity (1.0 ppm $N_2O$ in He). The fourth column of Table 1 also indicates examples of preferred adsorbents of the invention (i.e. adsorbents with high $N_2O$ loading in the presence of $N_2$).

EXAMPLE 2

$N_2$ Isotherms

Figure 3:
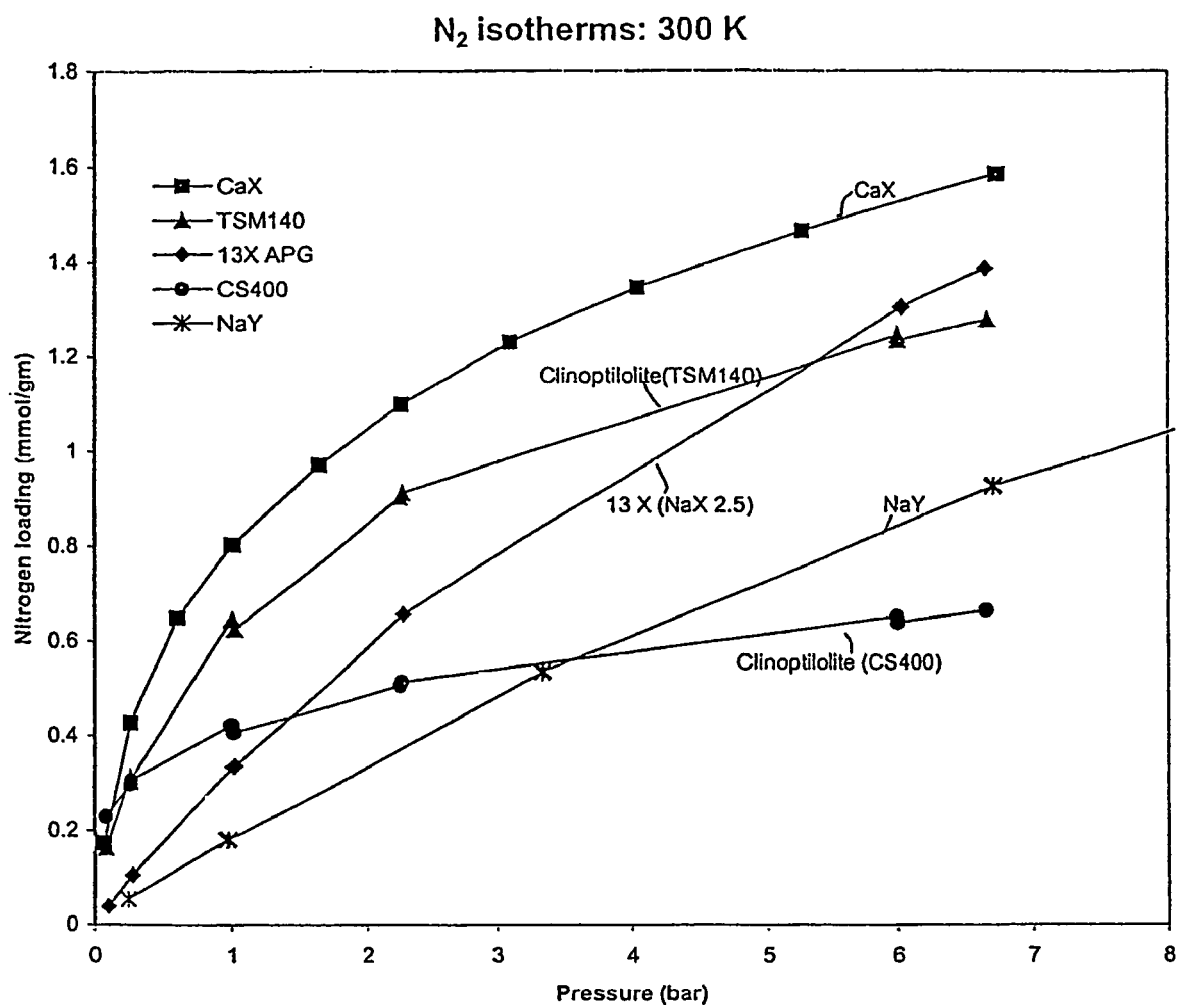
FIG. 3 are nitrogen isotherms for certain adsorbents.

Isotherms for $N_2$ at 300° K were determined for various adsorbents over a range of pressures which included typical feed pressures to a prepurifier of a cryogenic air separation unit. Example isotherms are shown in FIG. 3. The pure component $N_2$ loadings from these isotherms are compared in Table 2 for various adsorbents at 6.0 bar.

TABLE 2

Equilibrium Loadings of $N_2$ at 6.0 bar, 300° K

| Material | $N_2$ loading (mmol/gm) |
|---|---|
| Silicalite | 0.68 |
| H-ZSM5 | 0.74 |
| 4A | 1.11 |
| NaY | 0.85 |
| NaZSM5 | |
| NaKX | 0.86 |
| 13X NaX (2.5) | 1.30 |
| NaX (2.3) | 1.33 |
| CaX | 1.53 |
| Na-Mordenite | 1.40 |
| Clinoptilolite (CS400) | 0.64 |
| LiX (2.3) | 1.71 |
| LiX (2.0) | 2.29 |
| Chabazite | 1.22 |
| Clinoptilolite (TSM140) | 1.23 |

EXAMPLE 3

Breakthrough at 50 ppb $N_2O$

Figure 4:
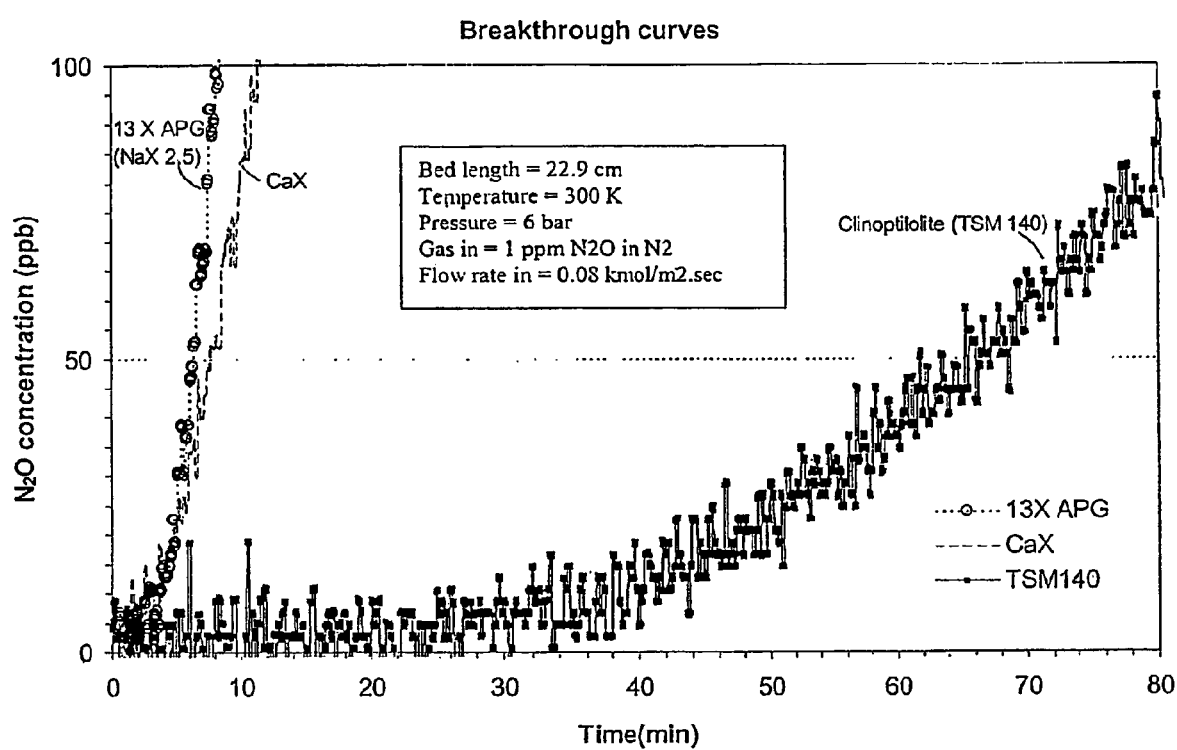
FIG. 4 are breakthrough curves to show initial breakthrough (0.05 ppm level)
Figure 5:
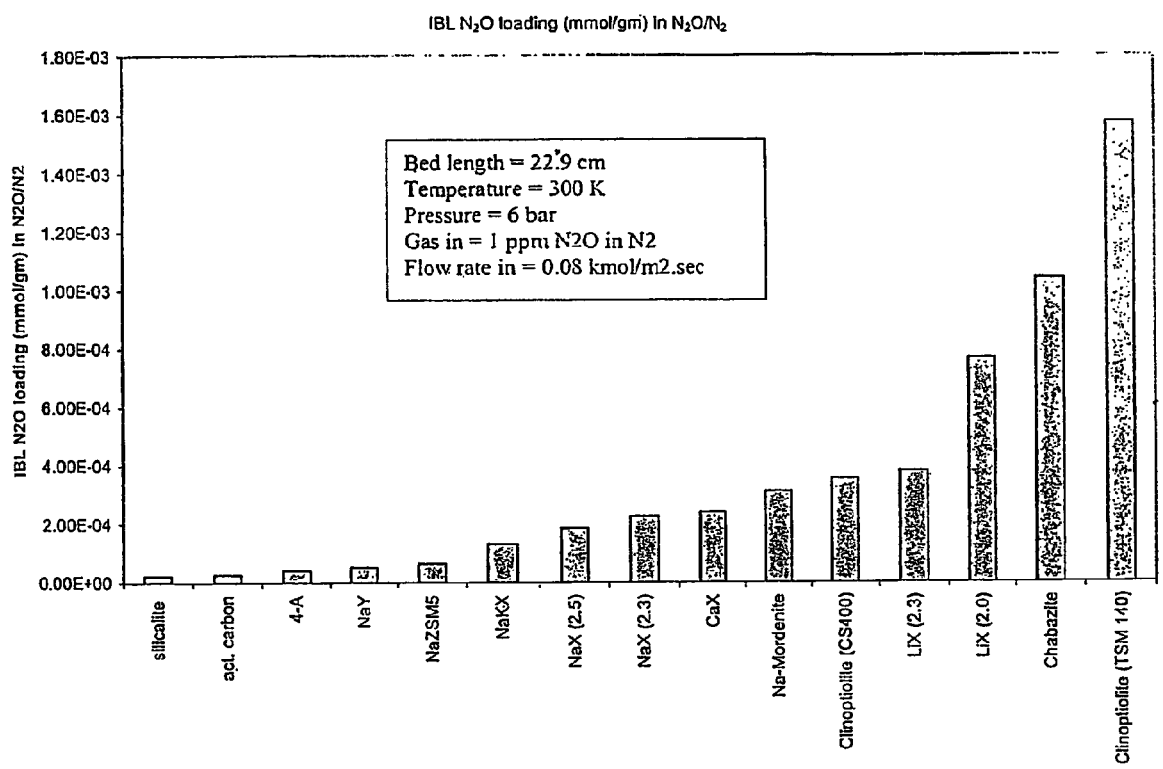
FIG. 5 illustrates IBL $N_2O$ loading for certain adsorbents (IBL:Initial breakthrough loading—$N_2O$ adsorbed per unit weight of adsorbent at the 50 ppb breakthrough)

The average $N_2O$ loading (IBL) of the adsorbent bed was determined at 50.0 ppb $N_2O$ from the same $N_2O/N_2$ tests reported in Table 1 above. Typical breakthrough results are illustrated in FIG. 4. The IBL values (reflecting not only the 50 ppb breakthrough, but also $N_2$ coadsorption) are compared for various adsorbents in Table 3 and shown in FIG. 5. Separation factors were also computed using Equation 3. The $N_2$ loadings at 6 bar from Table 2 are used in Equation 3 to represent the working capacity of $N_2$ in the process.

$N_2O$ working capacities can be computed either from the saturation loadings of $N_2O/N_2$ or from the average loadings of $N_2O$ at the IBL. The separation factor computed from the average loadings at the IBL is the preferred method since it reflects both the equilibrium and dynamic effects of the adsorbent. Nevertheless, the former method (which reflects equilibrium effects only) is acceptable when only isotherms and no breakthrough data are available. Both separation factors are tabulated in Table 3 for various adsorbents. Both methods identify clinoptilolite (TSM-140) as having the highest $N_2O/N_2$ separation factor, as well as establishing the same group of six adsorbents with higher separation factors compared to the prior art choice of CaX. The order of effectiveness amongst the adsorbents in the preferred group is affected by which separation factor method is used.

Using the methodology of the invention, clinoptilolite TSM-140 is the most preferred adsorbent for removing $N_2O$ from air. This adsorbent has the highest $N_2O$ working capacity at IBL, the highest working $N_2O/N_2$ separation factor and a moderate $N_2$ working capacity. It is evident from Table 3 that TSM140 has approximately 6.6 times the average $N_2O$ breakthrough capacity of CaX. Thus, clinoptilolite TSM140 provides a surprisingly superior solution to the problem.

TABLE 3

IBL and α for Various Adsorbents

| Material | IBL (mmol/gm) | α (Eqn 3) $N_2O$ @ IBL | α (Eqn 3) $N_2O$ @ 1.0 ppm |
|---|---|---|---|
| Silicalite | $2.20 \times 10^{-5}$ | $3.24 \times 10^{-5}$ | $1.11 \times 10^{-4}$ |
| Activated carbon | $2.60 \times 10^{-5}$ | | |
| H-ZSM5 | $3.60 \times 10^{-5}$ | $4.89 \times 10^{-5}$ | $1.85 \times 10^{-4}$ |
| 4A | $4.30 \times 10^{-5}$ | $3.87 \times 10^{-5}$ | |
| NaY | $5.20 \times 10^{-5}$ | $6.09 \times 10^{-5}$ | $1.67 \times 10^{-4}$ |
| NaZSM5 | $6.50 \times 10^{-5}$ | | |
| NaKX | $1.32 \times 10^{-4}$ | $1.54 \times 10^{-4}$ | $5.33 \times 10^{-4}$ |
| 13X NaX (2.5) | $1.87 \times 10^{-4}$ | $1.44 \times 10^{-4}$ | $4.68 \times 10^{-4}$ |
| NaX (2.3) | $2.27 \times 10^{-4}$ | $1.71 \times 10^{-4}$ | $5.29 \times 10^{-4}$ |
| CaX | $2.40 \times 10^{-4}$ | $1.57 \times 10^{-4}$ | $1.29 \times 10^{-3}$ |
| Na-Mordenite | $3.13 \times 10^{-4}$ | $2.24 \times 10^{-4}$ | $4.56 \times 10^{-3}$ |
| Clinoptilolite (CS400) | $3.56 \times 10^{-4}$ | $5.57 \times 10^{-4}$ | $5.64 \times 10^{-3}$ |
| LiX (2.3) | $3.82 \times 10^{-4}$ | $2.23 \times 10^{-4}$ | $7.10 \times 10^{-4}$ |
| LiX (2.0) | $7.68 \times 10^{-4}$ | $3.35 \times 10^{-4}$ | $7.61 \times 10^{-4}$ |
| Chabazite | $1.04 \times 10^{-3}$ | $8.55 \times 10^{-4}$ | $2.81 \times 10^{-3}$ |
| Clinoptilolite (TSM140) | $1.58 \times 10^{-3}$ | $1.28 \times 10^{-3}$ | $6.64 \times 10^{-3}$ |

EXAMPLE 4

$N_2O$ and $CO_2$ Coadsorption Effects

In the present invention, the adsorber is preferably configured so that the water vapor and $CO_2$ contaminants in the feed air are substantially removed from the gas mixture prior to the final clean up of the stream in which $N_2O$ is adsorbed. Sufficient removal of $N_2O$ must be affected to prevent breakthrough beyond 50 ppb $N_2O$ during the adsorption step of the prepurifier cycle. In this situation, it is estimated that low levels of $CO_2$ (less than 10.0 ppm, most likely less than 1.0 ppm) could be present with 100 ppb or more $N_2O$ with the remaining bulk gas being of air composition ($N_2/O_2$). In order to verify the effectiveness of the adsorbent and to determine the competitive coadsorption effects of $CO_2$ upon $N_2O$, breakthrough tests were performed with clinoptilolite TSM140 using a feed mixture with 1.0 ppm $CO_2$ and 1.0 ppm $N_2O$ in $N_2$. The results are shown in Table 4 for the average IBL loading and saturated loadings of $N_2O$. The loadings are comparable within the experimental error with the $N_2O$ loadings from Tables 1 and 3. Thus, it is evident that $CO_2$ and $N_2O$ do not compete with each other at these low concentrations, i.e. each competes individually only with $N_2$. This can be explained by the fact that the number of adsorbed molecules of $N_2$ (Table 3) is far greater than either those adsorbed molecules of $N_2O$ or $CO_2$. As $N_2O$ or $CO_2$ enter the adsorbent the adsorption sites are predominantly occupied by $N_2$ molecules.

TABLE 4

IBL and saturation loadings (1 ppm $N_2O$ + 1 ppm $CO_2$ in $N_2$)

| IBL $N_2O$ (mmol/gm) | $N_2O$ saturation loading (mmol/gm) |
|---|---|
| $1.6 \times 10^{-3}$ | $8.3 \times 10^{-3}$ |

These results suggest that other low-level contaminants present in the gas stream can also be removed simultaneously with $N_2O$. In the case of clinoptilolite, adsorbates with a kinetic diameter less than about 4.5 Å and with an interaction potential energy greater than that of $N_2$ are likely to be completely or partially removed. Such adsorbates include but are not limited to acetylene, ethylene and propane.

EXAMPLE 5

Prepurifier Operation

A two-bed TSA prepurifier was designed to evaluate the adsorbent requirement for complete $N_2O$ removal. The inlet air flow was 569,000 NCFH at a pressure of 72 psig, and an ambient temperature of about 78 F. The ambient $N_2O$ level was about 400 ppb and the $CO_2$ level was about 400 ppm. Average temperature of air going into the prepurifier was about 44.6 F. Each bed has an internal diameter of 8.0 ft.

Initially the bed has two layers: First layer of Alumina (9.9 in) and the second layer of 13X APG (46.5 in). The breakthrough level of $N_2O$ was monitored for this two-layered bed system. It was found that about 80% of the entering $N_2O$ in each cycle is retained in the bed. About 20% of the incoming $N_2O$ breaks through the bed. The thickness of the clinoptilolite TSM 140 layer needed to ensure complete $N_2O$ removal if this layer is added downstream of 13 X layer was calculated to be about 9 in. Therefore, a very thin layer of clinoptilolite TSM140 added downstream of 13X layer substantially eliminates the problem of $N_2O$ leaking into the cold box. The resulting prepurifier with the three layers could substantially eliminate all of water vapor, $CO_2$ and $N_2O$ and most of the hydrocarbons entering the bed.

The Si/Al ratio and the composition (% of exchangeable cations) of major cations in clinoptilolite TSM140 and CS400 are given in Table 5. It is evident from the working capacity in Table 1 and the selectivity in Table 3 that TSM 140 has superior ability to remove $N_2O$ in the presence of high concentrations of $N_2$ compared to CS400. Although both materials are of clinoptilolite structure with nearly the same Si/Al ratio, the efficiency of adsorption of $N_2O$ is quite different. A primary difference in the composition of these materials is in the amount of Na cation present. We have found that a preferred clinoptilolite would have sodium in an amount between about 30 to about 80% of the exchangeable cations.

TABLE 5

Composition of natural adsorbents

| | TSM140 | CS400 |
|---|---|---|
| Si/Al | 4.84 | 4.78 |
| % Ca | 12 | 34 |
| % Na | 62 | 14 |
| % K | 19 | 32 |
| % Mg | 7 | 20 |

As indicated above, clinoptilolite (most preferably TSM140 and CS400), chabazite and LiX (most preferably having a greater than 86% Li exchange and a $SiO_2/Al_2O_3$ ratio of (2.3) or (2.0)) were found to be the preferred adsorbents for removing $N_2O$ from air prior to cryogenic air separation.

The natural zeolites clinoptilolite and chabazite, having higher Si/Al ratio (3.0 to 5.0 in this invention) than type X zeolites, are "weaker" adsorbents compared to LiX, CaX and NaX. These natural zeolites also have a smaller micropore volume than type X. These factors contribute to the lower $N_2$ adsorption capacity and selectivity; however, overall capacity is typically not a critical issue when removing trace quantities of contaminants. Conversely, because of the higher Si/Al ratio of clinoptilolite and chabazite, these materials have fewer cations. This generally means weaker energetics in relation to polar adsorbates. While this favors weaker attraction for $N_2$ it also means weaker attraction for $N_2O$ as well.

The adsorption characteristics of zeolites are strongly dependent upon their cation composition. Both the equilibrium and kinetic adsorption properties can be altered by ion exchange. Cation type, location and number can completely alter adsorption behavior. Acid washing of small pore natural zeolites may remove impurities that block the pores, progressively eliminate cations and finally dealuminate the structure as the strength and duration of the treatment increases. Alkali washing has been shown to modify both the pore size and pore volume of clinoptilolite. The method and extent of dehydration is important in determining the adsorption properties and structural stability of activated zeolites. Dehydration and thermal treatment can result in cation migration, thereby influencing cation location and pore openings. Any of the methods may be used to further improve the adsorption characteristics of the preferred adsorbents of this invention, i.e. equilibrium and/or kinetic adsorption properties may be effected.

As indicated previously, the invention relates to the removal of $N_2O$ from air in which the $H_2O$ and $CO_2$ have already been substantially removed. By "substantially removed" we mean removed to levels of less than 10 ppm, preferably less than 1.0 ppm. However, the invention may be applied in removing $N_2O$ in the presence of higher concentrations of $CO_2$ and/or $H_2O$. In the most direct application of the invention, a layer of the $N_2O$-selective adsorbent is located downstream (as determined by the direction of feed flow during adsorption) of those adsorbents that are used to remove $H_2O$ and $CO_2$. Typical TSA prepurifiers have either a single layer of zeolite to remove both $H_2O$ and $CO_2$ or a layer of activated alumina (for $H_2O$ removal) followed by a layer of zeolite for $CO_2$ adsorption. In general, adsorbents useful for the water and $CO_2$ adsorption are known to those skilled in the art and include cation containing zeolites (synthetic or natural), activated alumina, silica gel and activated carbon.

In such configurations, the $N_2O$-selective layer would represent either a second or third layer of adsorbent, respectively, in the prepurifier adsorber. Other alternative configurations contemplated by this invention are described below. According to the invention $N_2O$ is adsorbed onto at least one adsorbent selected from natural clinoptilolite, natural chabazite and Li exchanged X zeolite. The removal of $N_2O$ from the gas stream is achieved by passing the gas stream through a bed of clinoptilolite, chabazite or LiX or a mixture of these in the temperature range of about $-70°$ C. to $80°$ C., preferably $0°$ C. to $40°$ C. While the invention is directed at the removal of low concentrations of $N_2O$ from air, it may also be used to remove higher concentrations of $N_2O$ from air or other gas mixtures. Typical gases that can be purified by this process include air, nitrogen, oxygen, argon, methane etc.

The process of $N_2O$ removal is carried out preferably in a cyclic process such as pressure swing adsorption (PSA), temperature swing adsorption (TSA), vacuum swing adsorption (VSA) or a combination of these. Such processes can be used for removing ppm or ppb levels of $N_2O$ present in air prior to cryogenic separation. The process of the invention may be carried out in single or multiple adsorption vessels operating in a cyclic process that includes at least the steps of adsorption and regeneration. The adsorption step is carried out at pressure range of 1.0 to 25 bar and preferentially from about 3 to 15 bar. The temperature range during the adsorption step is $-70°$ C. to $80°$ C. When a PSA process is used, the pressure during the regeneration step is lower than the adsorption pressure, preferably in the range of about 0.20 to 10.0 bar, and preferably 1.0 to 2.0 bar. For a TSA process, regeneration is carried out at a temperature greater than the adsorption temperature; preferably in the range of about $50°$ C. to $400°$ C., more preferably between $100°$ C. to $300°$ C. In cryogenic air separation processes, the regeneration gas is typically taken from the product or waste $N_2$ or $O_2$ streams.

In the cyclic process, the gas containing $N_2O$ is introduced at one end of an adsorption vessel that contains at least a layer of $N_2O$-selective adsorbent. As the gas passes through the bed, $N_2O$ is adsorbed and an essentially $N_2O$-free gas is obtained at the other end of the bed. As the adsorption step proceeds, a $N_2O$ front develops in the bed and moves forward through the bed during the adsorption step. When the front reaches the end of the bed, which is determined by the concentration of $N_2O$ acceptable in the outlet gas, the adsorption step is terminated and the vessel enters the regeneration mode. The method of regeneration depends upon the type of cyclic process. For a PSA process, generally the vessel is countercurrently depressurized. Subatmospheric pressure levels can be additionally employed during the regeneration steps using a vacuum pump. For a TSA process, regeneration of the adsorbent bed is achieved by passing heated gas countercurrently through the bed. Using the thermal pulse method, a cooling purge step follows the hot purge step. The heated regeneration gas may also be provided at a reduced pressure (relative to the feed) so that a combined TSA/PSA process is affected. For removal of $N_2O$ from air, the TSA/PSA method is preferred.

In some cases, passing an inert or weakly adsorbed purge gas countercurrently through the bed can further clean the adsorbent bed. In a PSA process, the purge step usually follows the countercurrent depressurization step. In a TSA process, the heated purge gas can be used for regeneration of adsorbent. In case of a single vessel system, the purge gas can be introduced from a storage vessel, while for multiple bed system, purge gas can be obtained from another adsorber that is in the adsorption phase.

The adsorption system can have more steps than the two basic fundamental steps of adsorption and desorption. For example, top to top equalization or bottom to bottom equalization can be used to conserve energy and increase recovery.

Figure 6:
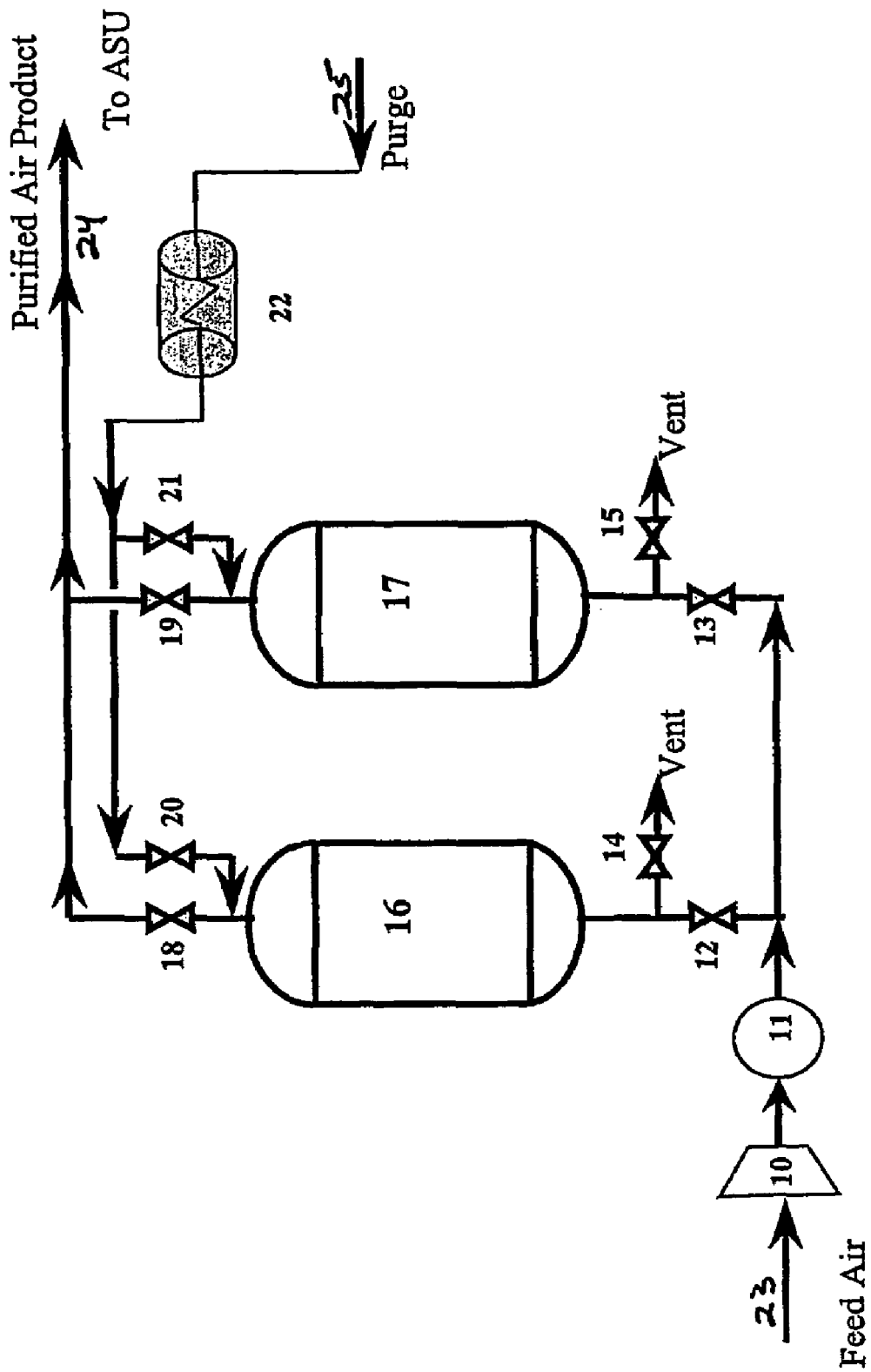
FIG. 6 is a schematic of an adsorption system useful for practicing the invention.

In a specific embodiment, the prepurification process operates as follows with reference to FIG. 6. Referring to FIG. 6, feed air fed to the system via conduit 23 is compressed in compressor 10 and cooled by chilling means 11 prior to entering one of two adsorbers (16 and 17) where at least the contaminants $H_2O$, $CO_2$ and $N_2O$ are removed from the air. The purified air exits the adsorber via conduit 24 and then enters the air separation unit (ASU) (not shown) where it is then cryogenically separated into its major components $N_2$ and $O_2$. In special designs of the ASU, Ar, Kr and Xe may also be separated and recovered from the air. While one of the beds is adsorbing the contaminants from air, the other is being regenerated using purge gas provided via conduit 25. A dry, contaminant-free purge gas may be supplied from the product or waste stream from the ASU or from an independent source to desorb the adsorbed contaminants and thereby regenerate the adsorber and prepare it for the next adsorption step in the cycle. The purge gas may be $N_2$, $O_2$, a mixture of $N_2$ and $O_2$, air or any dry inert gas. In the case of thermal swing adsorption (TSA), the purge gas is first heated in heater 22 prior to being passed through the adsorber in a direction countercurrent to that of the feed flow in the adsorption step. TSA cycles may also include a pressure swing. When only pressure swing adsorption (PSA) is utilized, there is no heater.

The operation of a typical TSA/PSA cycle is now described in reference to FIG. 6 for one adsorber 16. One skilled in the art will appreciate that the other adsorber vessel 17 will operate with the same cycle, only out of phase with the first adsorber in such a manner that purified air is continuously available to the ASU. Feed air is introduced via conduit 23 to compressor 10 where it is pressurized. The heat of compression is removed in chilling means 11, e.g. a mechanical chiller or a combination of direct contact after-cooler and evaporative cooler. The pressurized, cool and $H_2O$-saturated feed stream then enters adsorber 16. Valve 12 is open and valves 14, 18 and 20 are closed as the adsorber vessel 16 is pressurized. Once the adsorption pressure is reached, valve 18 opens and purified product is directed to the ASU with conduit 24 for cryogenic air separation. When the adsorber 16 has completed the adsorption step, valves 18 and 12 are closed and valve 14 is opened to blow down the adsorber 16 to a lower pressure, typically near ambient pressure. Once depressurized, valve 20 is opened and heated purge gas is introduced into the product end of the adsorber 16. At some time during the purge cycle, the heater is turned off so that the purge gas cools the adsorber to near the feed temperature. The other adsorber 17 will operate with the same cycle with valves 13, 15, 19 and 21.

One of ordinary skill in the art will further appreciate that the above description represents only an example of a typical prepurifier cycle, and there are many variations of such a typical cycle that may be used with the present invention. For example, PSA may be used alone wherein both the heater 22 and the chilling means 11 may be removed. Pressurization may be accomplished with product gas, feed gas or a combination of the two. As indicated above, bed-to-bed equalization may also be used and a blend step may be incorporated where a freshly regenerated bed is brought on line in the adsorption step with another adsorber nearing completion of its adsorption step. Such a blend step serves to smooth out pressure disturbances due to bed switching and also to minimize any thermal disturbances caused when the regenerated bed is not completely cooled to the feed temperature. Furthermore, the invention may be practiced with a prepurifier cycle not limited to two adsorber beds.

As indicated above, the most preferred embodiment of the present invention is the removal of trace amounts of $N_2O$ from gaseous streams, particularly from air prior to cryogenic separation. The method of the invention is particularly applicable to the removal of low to intermediate (e.g. ppb to ppm) concentrations of $N_2O$ from a feed stream. For example, the methodology is particularly useful in air prepurification (prior to cryogenic distallation) where the $N_2O$ concentration is on the order of 350 ppb. The adsorbents are also especially effective for the removal of $N_2O$ from gas streams containing 100 ppm or less $N_2O$. If the gas contains water vapor, this should most preferably be removed to a level of less than 100 ppb prior to passing it through the $N_2O$ adsorbent. If the gas contains $CO_2$, $CO_2$ should be removed to levels less than 10 ppm, preferably less than 1 ppm, however, removal of $CO_2$ is not as essential as removal of water vapor. The relative thickness of the $N_2O$ layer depends upon the pressure, temperature, composition and flow of the feed gas and the desired purity of the purified gas, but could be determined by one of ordinary skill in the art.

As indicated above, in a preferred air prepurification embodiment of the invention, water vapor and $CO_2$ are substantially removed from air on at least one layer of activated alumina or zeolite, or by multiple layers of activated alumina and zeolite prior to passing the air stream through the $N_2O$ adsorbent layer. Optionally, the $N_2O$-selective adsorbent layer may be extended and used to remove part or all of the $CO_2$ from air. Alternately, in an adsorption vessel, a first layer of alumina can be used to remove water vapor and a next layer comprised of a mixture of the $N_2O$-selective adsorbent and 13X (or other zeolite) can be used to remove both $CO_2$ and $N_2O$ from the air. Such an adsorbent mixture may be composed of physically separate adsorbents or of different adsorbents bound together in the form of a composite. Additionally, the $N_2O$ selective adsorbent may be deposited in the form of fine particles on a substrate such as a monolith.

In the existing prepurifier beds with water adsorbent layer and $CO_2$ adsorbent layer, the method of the invention allows for replacing 10-100% of $CO_2$ adsorbent layer with the $N_2O$ adsorbent at the most downstream end.

As illustrated in FIGS. 7a and 7b various layered arrangements of a bed 30 are possible. FIG. 7a shows for example a bed 30 arrangement comprising a layer of a. first adsorbent for water removal 31; a layer 32 of a second adsorbent for $CO_2$ removal; and a third layer 33 that is the $N_2O$ adsorbent.

In FIG. 7b, a bed 30 arrangement having a first layer of water adsorbent 31' and a second layer 34 that is a mixture or composite of a CO2 adsorbent and the $N_2O$ adsorbent Some chemically modified forms of the adsorbents used in the process of this invention would also be appropriate for $N_2O$ removal purposes. Thus, the method of the invention can be carried out wherein said clinoptilolite and chabazite are natural or synthetic, and have exchangeable cations from ions of Group 1A, Group 2A, Group 3A, Group 3B, the lanthanide series of the Periodic Table, as well as mixtures of these. According to the invention, at least nitrous oxide gas contained in a gas stream is separated, whereby $N_2O$ is adsorbed on at least one adsorbent or a mixture of these selected from the following: natural clinoptilolite, natural chabazite and Li exchanged X zeolite. The mixture can be made with any ratio of these adsorbents namely 0-100% clinoptilolite, 0-100% chabazite and 0-100% LiX, wherein the total of these is 100%.

The adsorbent beds used in the method of the invention can have a variety of configurations, such as vertical beds, horizontal beds or radial beds and can be operated in a pressure swing adsorption mode, temperature swing adsorption mode, vacuum swing adsorption mode or a combination of these.

Clinoptilolite has excellent thermal stability at very high temperatures up to 700° C. Thus, it can be regenerated at very high temperatures if needed.

Since clinoptilolite and chabazite are natural zeolites mined from the earth, they should be thermally treated before being used in the method of the invention. These natural zeolites should also be ground to a suitable average grain size, for example, 4 to 50 mesh, preferably 8 to 12 mesh (US Sieve Series), although smaller or larger average sizes may be employed depending upon the requirements of the application.

In the method of the invention, the ground natural mineral with predetermined grain size distribution is thermally treated at a temperature of 250° C. to 700° C. It is important to dehydrate the zeolites to less than 1.0 % (wt) $H_2O$. Those skilled in the art are familiar with such sizing and calcination procedures.

The adsorbents in this method may be shaped by a series of methods into various geometrical forms such as beads and extrudates. This might involve addition of a binder to zeolite powder in ways very well known to prior art. These binders might also be necessary for tailoring the strength of the adsorbents. Binder types and shaping procedures are well known to prior art and the current invention does not put any constraints on the type and percentage amount of binders in the adsorbents.

The $N_2O$ adsorbent could also potentially adsorb some hydrocarbons from air. To ensure complete removal of hydrocarbons, the $N_2O$ adsorbent can be physically mixed in a layer 35 with a hydrocarbon selective adsorbent such as 5A (Bed 30 in FIG. 7c). Alternately, an additional layer of hydrocarbon selective adsorbent can be placed upstream (layer 36) or downstream (not shown) of the $N_2O$ adsorbent layer 33" (Bed 30 in FIG. 7d). Note that 31" and 31'" refer to a layer of water adsorbent and 32' and 32" refer to a layer of $CO_2$ adsorbent in FIGS. 7c and 7d respectively.

The term "comprising" is used herein as meaning "including but not limited to", that is, as specifying the presence of stated features, integers, steps or components as referred to in the claims, but not precluding the presence or addition of one or more other features, integers, steps, components, or groups thereof.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. An adsorption purification process for the removal of $N_2O$ from a gas containing less than 100 ppm of $N_2O$, nitrogen and other components, said process comprising passing said gas over a bed of one or more adsorbents and producing a purified gas, wherein said one or more adsorbents is selected from the group consisting of clinoptilolite, chabazite and Li-exchanged zeolite.

2. The process of claim 1, wherein said gas is air.

3. The process of claim 1, wherein said other components include water and $CO_2$.

4. The process of claim 3, wherein said water and said $CO_2$ are adsorbed on an additional adsorbent prior to said gas passing over said clinoptilolite, chabazite or said Li-exchanged zeolite.

5. The process of claim 1, wherein said process is either pressure swing adsorption or temperature swing adsorption.

6. The process of claim 1, wherein said process is a combination of temperature swing adsorption and pressure swing adsorption.

7. The process of claim 4, wherein at least 90% of the $N_2O$ in said gas is adsorbed.

8. The process of claim 1, wherein said adsorbent is clinoptilolite, and wherein between 30% and 80% of its exchangeable ions are sodium cations.

9. The process of claim 1, wherein said adsorbent has been washed with an acid or alkali solution prior to being placed in said bed.

10. The process of claim 1, wherein said Li-exchanged zeolite is LiX.

11. The process of claim 1, wherein said purified gas contains less than 100 ppb of $N_2O$.

12. The process of claim 1, wherein said purified gas contains less than 50 ppb of $N_2O$.

13. The process of claim 1, wherein said purified gas contains less than 10 ppb of $N_2O$.

14. The process of claim 6, wherein in said pressure swing adsorption process, adsorption takes place at a pressure between 1.0 to 25 bar, and desorption takes place at a pressure between 0.2 to 10.0 bar.

15. The process of claim 6, wherein in said temperature swing adsorption process, adsorption takes place at a temperature between −70 degrees Celsius and 80 degrees Celsius, and desorption takes place at a greater temperature than said adsorption.

16. A process for the separation of $N_2O$ from a gas stream containing at least $N_2O$ and nitrogen, wherein the concentration of $N_2O$ is less than 100 ppm, said process comprising passing said gas stream over a bed of adsorbent having a $\Delta N_2O$ working capacity of greater than or equal to $3.56 \times 10^{-4}$ at IBL.

17. The process of claim 16, wherein said gas stream is air.

18. The process of claim 16, wherein said adsorbent is selected from the group consisting of clinoptilolite, chabazite, Li-exchanged zeolite and combinations thereof.

19. The process of claim 16, wherein the $\Delta N_2O/\Delta N_2$ selectivity is greater than or equal to $2.23 \times 10^{-4}$ at IBL.

20. An adsorption apparatus for the removal of $N_2O$ from a gas containing $N_2O$, nitrogen and other components, said apparatus comprising one or more beds of at least a first adsorbent, wherein said first adsorbent is an $N_2O$ selective adsorbent selected from the group consisting of clinoptilolite, chabazite and Li-exchanged zeolite or combinations thereof, wherein said apparatus comprises a layer of alumina and a mixed layer of said $N_2O$ selective adsorbent and an adsorbent selective for $CO_2$ downstream of said layer of alumina.

21. An adsorption apparatus for the removal of $N_2O$ from a gas containing $N_2O$, nitrogen and other components, said apparatus comprising one or more beds of at least a first adsorbent, wherein said first adsorbent is an $N_2O$ selective adsorbent selected from the group consisting of clinoptilolite, chabazite and Li-exchanged zeolite or combinations thereof, wherein said apparatus comprises a layer of alumina and, downstream therefrom, a layer of a composite material comprising said $N_2O$ selective adsorbent and an adsorbent selective for $CO_2$ bound into a single particulate material.

* * * * *